US011036810B2

(12) United States Patent
Prakash et al.

(10) Patent No.: US 11,036,810 B2
(45) Date of Patent: Jun. 15, 2021

(54) SYSTEM AND METHOD FOR DETERMINING QUALITY OF CITED OBJECTS IN SEARCH RESULTS BASED ON THE INFLUENCE OF CITING SUBJECTS

(75) Inventors: Vipul Ved Prakash, San Francisco, CA (US); Lun Ted Cui, Fremont, CA (US); Rishab Aiyer Ghosh, San Francisco, CA (US); Thomas James Emerson, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 839 days.

(21) Appl. No.: 13/158,992

(22) Filed: Jun. 13, 2011

(65) Prior Publication Data

US 2011/0307466 A1    Dec. 15, 2011
US 2012/0239637 A9    Sep. 20, 2012

Related U.S. Application Data

(63) Continuation-in-part of application No. 12/895,593, filed on Sep. 30, 2010, now Pat. No. 7,991,725, and
(Continued)

(51) Int. Cl.
*G06F 16/951* (2019.01)
*G06F 16/31* (2019.01)

(52) U.S. Cl.
CPC .......... *G06F 16/951* (2019.01); *G06F 16/313* (2019.01)

(58) Field of Classification Search
CPC .... G06Q 30/00; G06Q 30/0263; G06Q 50/01; G06Q 30/0254; G06Q 30/0201; G06F 17/3064; G06F 17/30728; G06F 17/3097
(Continued)

(56) References Cited

U.S. PATENT DOCUMENTS 6,151,585 A    11/2000  Altschuler et al.
6,286,005 B1    9/2001  Cannon
(Continued)

FOREIGN PATENT DOCUMENTS

JP         2003288437 A    10/2003
WO    WO-2006073977 A1    7/2006
(Continued)

OTHER PUBLICATIONS

Liu, "Co-authorship networks in the digital library research community", 2005, Elsevier, Information Processing and Management 41 (2005) pp. 1462-1480.
(Continued)

*Primary Examiner* — Alex Gofman
*Assistant Examiner* — Linh Black
(74) *Attorney, Agent, or Firm* — Womble Bond Dickinson (US) LLP

(57) ABSTRACT

A new approach is proposed that contemplates systems and methods to examine and determine quality of objects cited by citations in a search result based on a citation graph that includes citing subjects, citations, and cited objects. First, influence scores of a plurality of subjects/sources that compose the citations of the objects in the search result are calculated. The quality of the objects cited by the subjects can then be determined by examining the influence scores for the subjects of the citations. Finally, the cited objects selected can be presented to a user or provided to a thirty party for further processing together with the relevant citations and citing subjects.

51 Claims, 3 Drawing Sheets

Related U.S. Application Data a continuation-in-part of application No. 12/628,791, filed on Dec. 1, 2009, now Pat. No. 8,688,701, and a continuation-in-part of application No. 12/628,801, filed on Dec. 1, 2009, now Pat. No. 8,244,644.

(60) Provisional application No. 61/354,551, filed on Jun. 14, 2010, provisional application No. 61/354,584, filed on Jun. 14, 2010, provisional application No. 61/354,556, filed on Jun. 14, 2010, provisional application No. 61/354,559, filed on Jun. 14, 2010.

(58) Field of Classification Search
USPC .... 707/939, 723, 735, 748, 688; 702/81–82, 702/182; 700/91–92; 725/24
See application file for complete search history.

(56) References Cited

U.S. PATENT DOCUMENTS

| | | | |
|---|---|---|---|
| 6,886,010 B2* | 4/2005 | Kostoff | G06F 17/30705 |
| 7,512,612 B1 | 3/2009 | Akella et al. | |
| 7,636,714 B1 | 12/2009 | Lamping et al. | |
| 7,885,844 B1* | 2/2011 | Cohen et al. | |
| 7,945,483 B2* | 5/2011 | Inghelbrecht | G06Q 30/0207 |
| | | | 705/26.1 |
| 8,086,605 B2 | 12/2011 | Xu et al. | |
| 8,166,026 B1 | 4/2012 | Sadler | |
| 8,166,925 B2 | 5/2012 | Suggett | |
| 8,352,549 B2* | 1/2013 | Sacco et al. | 709/204 |
| 8,572,173 B2 | 10/2013 | Briere et al. | |
| 2002/0062368 A1* | 5/2002 | Holtzman | G06F 21/31 |
| | | | 709/224 |
| 2002/0073079 A1* | 6/2002 | Terheggen | G06F 16/3328 |
| 2003/0110056 A1 | 6/2003 | Berghofer et al. | |
| 2003/0229531 A1 | 12/2003 | Heckerman et al. | |
| 2004/0225592 A1 | 11/2004 | Churquina | |
| 2005/0060312 A1 | 3/2005 | Curtiss et al. | |
| 2005/0131897 A1 | 6/2005 | Grasso et al. | |
| 2005/0154690 A1 | 7/2005 | Nitta et al. | |
| 2005/0192957 A1 | 9/2005 | Newbold | |
| 2005/0256866 A1 | 11/2005 | Lu et al. | |
| 2006/0041543 A1 | 2/2006 | Achlioptas | |
| 2006/0059055 A1 | 3/2006 | Lin | |
| 2006/0074836 A1 | 4/2006 | Gardner et al. | |
| 2006/0106847 A1* | 5/2006 | Eckardt, III | G06F 17/30696 |
| 2006/0112111 A1 | 5/2006 | Tseng et al. | |
| 2006/0112146 A1* | 5/2006 | Song et al. | 707/200 |
| 2006/0218577 A1 | 9/2006 | Goodman et al. | |
| 2006/0248073 A1 | 11/2006 | Jones et al. | |
| 2006/0294085 A1 | 12/2006 | Rose et al. | |
| 2006/0294086 A1 | 12/2006 | Rose et al. | |
| 2006/0294134 A1 | 12/2006 | Berkhim et al. | |
| 2007/0027744 A1 | 2/2007 | Carson et al. | |
| 2007/0073748 A1* | 3/2007 | Barney | 707/101 |
| 2007/0078699 A1 | 5/2007 | Scott et al. | |
| 2007/0121843 A1 | 5/2007 | Atazky et al. | |
| 2007/0124432 A1 | 5/2007 | Holtzman et al. | |
| 2007/0150398 A1 | 6/2007 | Rossen et al. | |
| 2007/0156636 A1 | 7/2007 | Norton et al. | |
| 2007/0168533 A1 | 7/2007 | Canright et al. | |
| 2007/0208613 A1 | 9/2007 | Backer | |
| 2007/0214097 A1* | 9/2007 | Parsons | G06Q 30/0264 |
| | | | 706/12 |
| 2007/0219863 A1 | 9/2007 | Park et al. | |
| 2007/0226248 A1 | 9/2007 | Darr | |
| 2007/0282867 A1 | 12/2007 | Mcallister et al. | |
| 2007/0297405 A1 | 12/2007 | He | |
| 2008/0004942 A1 | 1/2008 | Calabria | |
| 2008/0010253 A1 | 1/2008 | Sidhu et al. | |
| 2008/0059466 A1 | 3/2008 | Luo et al. | |
| 2008/0104225 A1 | 5/2008 | Zhang et al. | |
| 2008/0133426 A1 | 6/2008 | Porat et al. | |
| 2008/0201348 A1* | 8/2008 | Edmonds | G06Q 30/02 |
| 2008/0215429 A1* | 9/2008 | Ramer et al. | 705/14 |
| 2008/0215557 A1* | 9/2008 | Ramer et al. | 707/4 |
| 2008/0215571 A1 | 9/2008 | Huang et al. | |
| 2008/0275833 A1 | 11/2008 | Zhou et al. | |
| 2008/0288305 A1 | 11/2008 | LaLuzerne et al. | |
| 2008/0288596 A1 | 11/2008 | Smith et al. | |
| 2008/0313011 A1 | 12/2008 | Rose et al. | |
| 2009/0037412 A1* | 2/2009 | Bard | G06F 17/30321 |
| 2009/0043797 A1* | 2/2009 | Dorie | G06F 17/3071 |
| 2009/0049038 A1 | 2/2009 | Gross | |
| 2009/0049308 A1 | 2/2009 | Gross | |
| 2009/0106224 A1 | 4/2009 | Roulland et al. | |
| 2009/0106244 A1 | 4/2009 | Dash et al. | |
| 2009/0119173 A1* | 5/2009 | Parsons et al. | 705/14 |
| 2009/0144272 A1* | 6/2009 | Adarsh | G06F 17/30864 |
| 2009/0217179 A1* | 8/2009 | Mons | G06F 17/30716 |
| | | | 715/760 |
| 2009/0234828 A1 | 9/2009 | Tu | |
| 2009/0240647 A1* | 9/2009 | Green et al. | 706/52 |
| 2009/0276500 A1 | 11/2009 | Karmarkar | |
| 2009/0319342 A1 | 12/2009 | Shilman et al. | |
| 2010/0058196 A1 | 3/2010 | Krishnan et al. | |
| 2010/0070448 A1* | 3/2010 | Omoigui | 706/47 |
| 2010/0070485 A1* | 3/2010 | Parsons | G06Q 30/0264 |
| | | | 707/709 |
| 2010/0100537 A1 | 4/2010 | Druzgalski et al. | |
| 2010/0119053 A1 | 5/2010 | Goeldi | |
| 2010/0121817 A1 | 5/2010 | Meyer | |
| 2010/0121839 A1 | 5/2010 | Meyer | |
| 2010/0121849 A1* | 5/2010 | Goeldi | 707/736 |
| 2010/0174692 A1 | 7/2010 | Meyer | |
| 2010/0262597 A1* | 10/2010 | Han | G06F 17/30864 |
| | | | 707/723 |
| 2010/0306192 A1 | 12/2010 | Kapur et al. | |
| 2011/0004465 A1 | 1/2011 | Rose et al. | |
| 2011/0022602 A1 | 1/2011 | Luo et al. | |
| 2011/0078156 A1 | 3/2011 | Koss | |
| 2011/0093459 A1 | 4/2011 | Dong et al. | |
| 2011/0191372 A1 | 8/2011 | Kaushansky et al. | |
| 2011/0212717 A1 | 9/2011 | Rhoads et al. | |
| 2012/0166438 A1 | 6/2012 | Wu et al. | |

FOREIGN PATENT DOCUMENTS

| | | |
|---|---|---|
| WO | WO2006/116516 A2 | 11/2006 |
| WO | WO2008/006059 A2 | 1/2008 |

OTHER PUBLICATIONS

Von Der Weth, "Towards an objective assessment of centrality measures in reputation systems", 2007, IEEE, 0-7695-2913.
Zhou, "Powertrust: A robust and scalable reputation system for trusted peer-to-peer computing", 2007, IEEE, 1-45-921907.
Makkonen et al., Topic Detection and Tracking with Spatio-Temporal Evidence, published Spring 2003.
Guha, R., Kumar, R., Raghavan, P., and Tomkins, A. 2004. Propagation of trust and distrust. In Proceedings of the 13th International Conference on World Wide Web (New York, NY, USA, May 17-20, 2004). WWW '04. ACM, New York, NY, pp. 403-412.
Ziegler, C. and Lausen, G. 2005. Propagation Models for Trust and Distrust in Social Networks Information Systems Frontiers 7, (Dec. 4-5, 2005), 337-358.
Tao, Yufei et al: "Selectivity Estimation of Predictive Spatio-Temporal Queries", Proceedings 19th International Conference on Data Engineering (ICDE'2003). Bangladore, India, Mar. 5-8, 2003; pp. 417-428.
Dai, Na et al: "Mining Anchor Text Trends for Retrieval" Mar. 28, 2010; pp. 127-139.
Ashkan, Azin et al: "Classifying and Characterizing Query Intent", Apr. 6, 2009, pp. 578-586.
Garfield, E.: "Citation Analysis as a Tool in Journal Evaluation", 1972, pp. 527-544, XP002381248.
Johnson, Caleb: "Likebutton.me Reveals What Your Friends 'Like' Across the Web"; Apr. 26, 2010, pp. 1-7; XP000002656471.
Anonymous: "H-index", Wikipedia, Internet Article, Jun. 10, 2010; pp. 1-3; XP000002656472.

(56) References Cited

OTHER PUBLICATIONS

Dietz, Laura et al: "Unsupervised Prediction of Citation Influences", Proceedings of the 24th International Conference on Machine Learning, Jun. 20, 2007; pp. 233-240; XP55004362.
Huang, Jeff et al: "Conversational Tagging in Twitter", Proceedings of the 21st ACM Conference on Hypertext and Hypermedia; Jun. 13, 2010; p. 173; XP55004356.
Page, L. et al: "The PageRank Citation Ranking: Bringing Order to the Web", Internet Citation; Jan. 29, 1998; XP002213518.
Massa, Paolo et al: "Using Trust in Recommender Systems: An Experimental Analysis"; Feb. 26, 2004; pp. section 1.1; pp. 222-223, sections 1.3 and 2; pp. 225-227 221-235.
Lu at al., "Finding Query Suggestions for PubMed", 2009, AMIA.
Fan, et al., "Suggesting Topic-Based Query Terms as Your Type", 2010 12th International Asia-Pacific Web Conference (Apr. 2010).

\* cited by examiner

SYSTEM AND METHOD FOR DETERMINING QUALITY OF CITED OBJECTS IN SEARCH RESULTS BASED ON THE INFLUENCE OF CITING SUBJECTS

This application claims the benefit of U.S. Provisional Patent Application No. 61/354,559, filed Jun. 14, 2010, and entitled "A system and method for determining influence of internet authors," and is hereby incorporated herein by reference. This application is a continuation-in-part of prior U.S. application Ser. No. 12/895,593 filed Sep. 30, 2010 (now U.S. Pat. No. 7,991,725). This application is also a continuation-in-part of current U.S. application Ser. No. 12/628,791 filed Dec. 1, 2009 now U.S. Pat. No. 8,688,701 and a continuation-in-part of current U.S. application Ser. No. 12/628,801 filed Dec. 1, 2009 now U.S. Pat. No. 8,244,664.

RELATED APPLICATIONS

This application claims the benefit of U.S. Provisional Patent Application No. 61/354,551, filed Jun. 14, 2010, and entitled "A system and method for determining quality of cited objects in search results," and is hereby incorporated herein by reference.

This application claims the benefit of U.S. Provisional Patent Application No. 61/354,584, filed Jun. 14, 2010, and entitled "A system and method for identifying and propagating citations from negative influence sources," and is hereby incorporated herein by reference.

This application claims the benefit of U.S. Provisional Patent Application No. 61/354,556, filed Jun. 14, 2010, and entitled "A system and method for ranking and displaying search results based on influence of the sources," and is hereby incorporated herein by reference.

This application claims the benefit of U.S. Provisional Patent Application No. 61/354,559, filed Jun. 14, 2010, and entitled "A system and method for determining influence of internet authors," and is hereby incorporated herein by reference.

BACKGROUND

Knowledge is increasingly more germane to our exponentially expanding information-based society. Perfect knowledge is the ideal that participants seek to assist in decision making and for determining preferences, affinities, and dislikes. Practically, perfect knowledge about a given topic is virtually impossible to obtain unless the inquirer is the source of all of information about such topic (e.g., autobiographer). Armed with more information, decision makers are generally best positioned to select a choice that will lead to a desired outcome/result (e.g., which restaurant to go to for dinner). However, as more information is becoming readily available through various electronic communications modalities (e.g., the Internet), one is left to sift through what is amounting to a myriad of data to obtain relevant and, more importantly, trust worthy information to assist in decision making activities. Although there are various tools (e.g., search engines, community boards with various ratings), there lacks any indicia of personal trustworthiness (e.g., measure of the source's reputation and/or influence) with located data.

Currently, a person seeking to locate information to assist in a decision, to determine an affinity, and/or identify a dislike can leverage traditional non-electronic data sources (e.g., personal recommendations—which can be few and can be biased) and/or electronic data sources such as web sites, bulletin boards, blogs, and other sources to locate (sometimes rated) data about a particular topic/subject (e.g., where to stay when visiting San Francisco). Such an approach is time consuming and often unreliable as with most of the electronic data there lacks an indicia of trustworthiness of the source of the information. Failing to find a plethora (or spot on) information from immediate non-electronic and/or electronic data source(s), the person making the inquiry is left to make the decision using limited information, which can lead to less than perfect predictions of outcomes, results, and can lead to low levels of satisfaction undertaking one or more activities for which information was sought.

Current practices also do not leverage trustworthiness of information or, stated differently, attribute a value to the influence of the source of data (e.g., referral). With current practices, the entity seeking the data must make a value judgment on the influence of the data source. Such value judgment is generally based on previous experiences with the data source (e.g., rely on Mike's restaurant recommendations as he is a chef and Laura's hotel recommendations in Europe as she lived and worked in Europe for 5 years). Unless the person making the inquiry has an extensive network of references from which to rely to obtain desired data needed to make a decision, most often, the person making the decision is left to take a risk or "roll the dice" based on best available non-attributed (non-reputed) data. Such a prospect often leads certain participants from not engaging in a contemplated activity. Influence accrued by persons in such a network of references is subjective. In other words, influence accrued by persons in such a network of references appear differently to each other person in the network, as each person's opinion is formed by their own individual networks of trust.

Real world trust networks follow a small-world pattern, that is, where everyone is not connected to everyone else directly, but most people are connected to most other people through a relatively small number of intermediaries or "connectors". Accordingly, this means that some individuals within the network may disproportionately influence the opinion held by other individuals. In other words, some people's opinions may be more influential than other people's opinions.

As referred to herein, influence is provided for augmenting reputation, which may be subjective. In some embodiments, influence is provided as an objective measure. For example, influence can be useful in filtering opinions, information, and data. It will be appreciated that reputation and influence provide unique advantages in accordance with some embodiments for the ranking of individuals or products or services of any type in any means or form. Therefore, there is a need to determine the influence of influence of the citing authors/sources/subjects, and take the influence of the citing subjects into consideration while soliciting their opinions and/or ranking the search results.

The foregoing examples of the related art and limitations related therewith are intended to be illustrative and not exclusive. Other limitations of the related art will become apparent upon a reading of the specification and a study of the drawings.

DETAILED DESCRIPTION OF EMBODIMENTS

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to examine and determine quality of objects cited by citations in a search result based on a citation graph that includes citing subjects, citations, and cited objects. Here, each citation may describe, for a non-limiting example, an opinion of an object by a source/subject, such as an Internet user of the object. The citations can be but are not limited to, Tweets, blog posts, and reviews of objects on Internet web sites. First, influence scores of a plurality of subjects/sources that compose the citations of the objects in the search result are calculated. The quality of the objects cited by the subjects can then be determined by examining the influence scores for the subjects of the citations. More specifically, the objects cited in the search result can be selected and ranked based on influence-weighted citation scores for the search result, wherein objects appear in the search result are ranked based on both a ranking function of the citations for the objects matching the query term of the search as well as influence of the sources of the citations. The cited objects selected can then be presented to a user or provided to a thirty party for further processing together with the relevant citations and citing subjects.

Citation Graph

Figure 1:
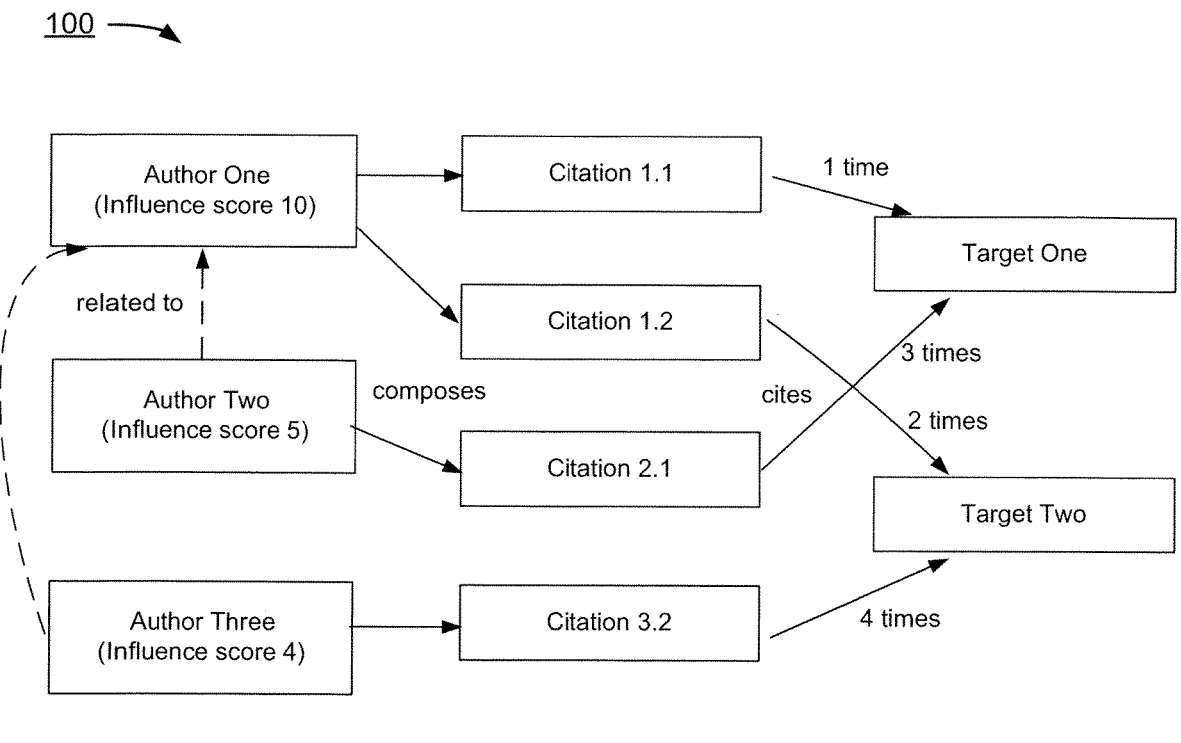
FIG. 1 depicts an example of a citation graph used to support determination of quality of cited objects in search results based on the influence of the citing subjects.

An illustrative implementation of systems and methods described herein in accordance with some embodiments includes a citation graph 100 as shown in FIG. 1. In the example of FIG. 1, the citation graph 100 comprises a plurality of citations 104, each describing an opinion of the object by a source/subject 102. The nodes/entities in the citation graph 100 are characterized into two categories, 1) subjects 102 capable of having an opinion or creating/making citations 104, in which expression of such opinion is explicit, expressed, implicit, or imputed through any other technique; and 2) objects 106 cited by citations 104, about which subjects 102 have opinions or make citations. Each subject 102 or object 106 in graph 100 represents an influential entity, once an influence score for that node has been determined or estimated. More specifically, each subject 102 may have an influence score indicating the degree to which the subject's opinion influences other subjects and/or a community of subjects, and each object 106 may have an influence score indicating the collective opinions of the plurality of subjects 102 citing the object.

In some embodiments, subjects 102 representing any entities or sources that make citations may correspond to one or more of the following:

Representations of a person, web log, and entities representing Internet authors or users of social media services including one or more of the following: blogs, Twitter, or reviews on Internet web sites;

Users of microblogging services such as Twitter;

Users of social networks such as MySpace or Facebook, bloggers;

Reviewers, who provide expressions of opinion, reviews, or other information useful for the estimation of influence.

In some embodiments, some subjects/authors 102 who create the citations 104 can be related to each other, for a non-limiting example, via an influence network or community and influence scores can be assigned to the subjects 102 based on their authorities in the influence network.

In some embodiments, objects 106 cited by the citations 104 may correspond to one or more of the following: Internet web sites, blogs, videos, books, films, music, image, video, documents, data files, objects for sale, objects that are reviewed or recommended or cited, subjects/authors, natural or legal persons, citations, or any entities that are or may be associated with a Uniform Resource Identifier (URI), or any form of product or service or information of any means or form for which a representation has been made.

In some embodiments, the links or edges 104 of the citation graph 100 represent different forms of association between the subject nodes 102 and the object nodes 106, such as citations 104 of objects 106 by subjects 102. For non-limiting examples, citations 104 can be created by authors citing targets at some point of time and can be one of link, description, keyword or phrase by a source/subject 102 pointing to a target (subject 102 or object 106). Here, citations may include one or more of the expression of opinions on objects, expressions of authors in the form of Tweets, blog posts, reviews of objects on Internet web sites Wikipedia entries, postings to social media such as Twitter or Jaiku, postings to websites, postings in the form of reviews, recommendations, or any other form of citation made to mailing lists, newsgroups, discussion forums, comments to websites or any other form of Internet publication.

In some embodiments, citations 104 can be made by one subject 102 regarding an object 106, such as a recommendation of a website, or a restaurant review, and can be treated as representation an expression of opinion or description. In some embodiments, citations 104 can be made by one subject 102 regarding another subject 102, such as a recommendation of one author by another, and can be treated as representing an expression of trustworthiness. In some embodiments, citations 104 can be made by certain object 106 regarding other objects, wherein the object 106 is also a subject.

In some embodiments, citation 104 can be described in the format of (subject, citation description, object, timestamp, type). Citations 104 can be categorized into various types based on the characteristics of subjects/authors 102, objects/targets 106 and citations 104 themselves. Citations 104 can also reference other citations. The reference relationship among citations is one of the data sources for discovering influence network.

Figure 2:
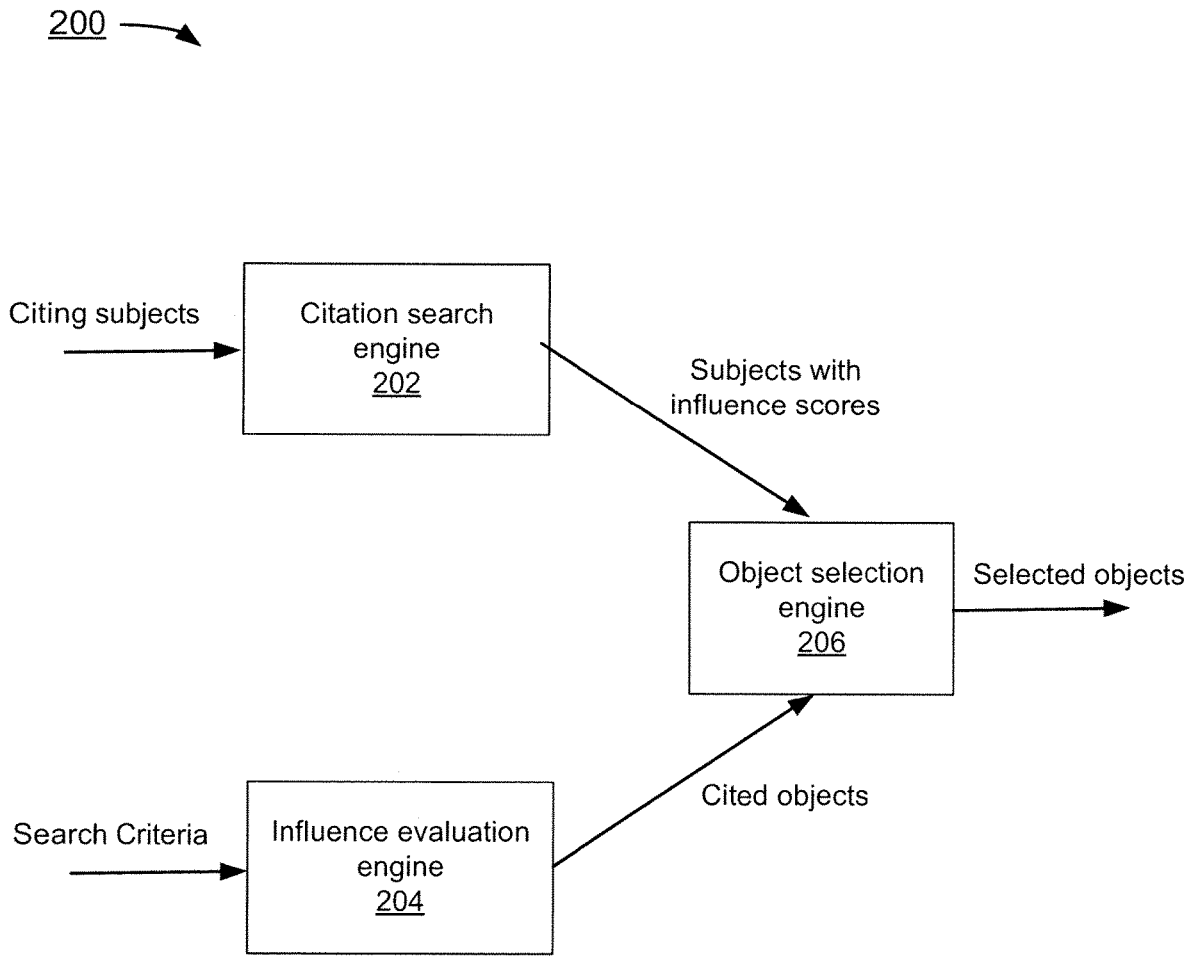
FIG. 2 depicts an example of a system diagram to support determination of quality of cited objects in search results based on the influence of the citing subjects.

FIG. 2 depicts an example of a system diagram to support determination of quality of cited objects in search results based on the influence of the citing subjects. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 2, the system 200 includes at least citation search engine 204, influence evaluation engine 204, and object selection engine 206. As used herein, the term engine refers to software, firmware, hardware, or other component that is used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

In the example of FIG. 2, each of the engines can run on one or more hosting devices (hosts). Here, a host can be a computing device, a communication device, a storage device, or any electronic device capable of running a software component. For non-limiting examples, a computing device can be but is not limited to a laptop PC, a desktop PC, a tablet PC, an iPod, an iPhone, an iPad, Google's Android device, a PDA, or a server machine. A storage device can be but is not limited to a hard disk drive, a flash memory drive, or any portable storage device. A communication device can be but is not limited to a mobile phone.

In the example of FIG. 2, citation search engine 202, influence evaluation engine 204, and object selection engine 206 each has a communication interface (not shown), which is a software component that enables the engines to communicate with each other following certain communication protocols, such as TCP/IP protocol, over one or more communication networks (not shown). Here, the communication networks can be but are not limited to, internet, intranet, wide area network (WAN), local area network (LAN), wireless network, Bluetooth, WiFi, and mobile communication network. The physical connections of the network and the communication protocols are well known to those of skill in the art.

Citation Search

In the example of FIG. 2, citation search engine 202 enables a citation search process, which unlike the "classical web search" approaches that is object/target-centric and focuses only on the relevance of the objects 106 to the searching criteria, the search process adopted by citation search engine 202 is "citation" centric, focusing on influence of the citing subjects 102 that cite the objects. In addition, the classical web search retrieves and ranks objects 106 based on attributes of the objects, while the proposed search approach adds citation 104 and subject/author 102 dimensions. The extra metadata associated with subjects 102, citations 104, and objects 106 provide better ranking capability, richer functionality and higher efficiency for the searches.

In some embodiments, the citation search/query request processed by citation search engine 202 may accept and enforce various criteria/terms on citation searching, retrieving and ranking, each of which can either be explicitly described by a user or best guessed by the system based on internal statistical data. Such criteria include but are not limited to, a) Constraints for the citations, including but are not limited to,
    Description: usually the text search query;
    Time range of the citations;
    Author: such as from particular author or sub set of authors;
    Type: types of citations;

b) Types of the cited objects: the output can be objects, authors or citations of the types including but are not limited to,
    Target types: such as web pages, images, videso, people
    Author types: such as expert for certain topic
    Citation types: such as tweets, comments, blog entries c) Ranking bias of the cited objects: which can be smartly guessed by the system or specified by user including but are not limited to,
    Time bias: recent; point of time; event; general knowledge; auto
    View point bias: such as general view or perspective of certain people.
    Type bias: topic type, target type.

Influence Evaluation

In the example of FIG. 2, influence evaluation engine 204 calculates influence scores of entities (subjects 102 and/or objects 106), wherein such influence scores can be used to determine at least in part, in combination with other methods and systems, the ranking of any subset of objects 106 obtained from a plurality of citations 104 from citation search results.

In some embodiments, influence evaluation engine 204 measures influence and reputation of subjects 102 that compose the plurality of citations 104 citing the plurality of objects 106 on dimensions that are related to, for non-limiting examples, one or more of the specific topic or objects (e.g., automobiles or restaurants) cited by the subjects, or form of citations (e.g., a weblog or Wikipedia entry or news article or Twitter feed), or search terms (e.g., key words or phrases specified in order to define a subset of all entities that match the search term(s)), in which a subset of the ranked entities are made available based on selection criteria, such as the rank, date or time, or geography/location associated with the entity, and/or any other selection criteria.

In some embodiments, influence evaluation engine 204 determines an influence score for a first subject or source at least partly based on how often a first subject is cited or referenced by a (another) second subject(s). Here, each of the first or the second subject can be but is not limited to an internet author or user of social media services, while each citation describes reference by the second subject to a citation of an object by the first subject. The number of the citations or the citation score of the first subject by the second subjects is computed and the influence of the second subjects citing the first subject can also be optionally taken into account in the citation score. For a non-limiting example, the influence score of the first subject is computed as a function of some or all of: the number of citations of the first subject by second subjects, a score for each such citation, and the influence score of the second subjects. Once computed, the influence of the first subject as reflected by the count of citations or citation score of the first subject or subject can be displayed to the user at a location associated with the first subject, such as the "profile page" of the first subject, together with a list of the second subjects citing the first subjects, which can be optionally ranked by the influences of the second subject.

In some embodiments, influence evaluation engine 204 allows for the attribution of influence on subjects 102 to data sources (e.g., sources of opinions, data, or referrals) to be estimated and distributed/propagated based on the citation graph 100. More specifically, an entity can be directly linked to any number of other entities on any number of dimensions in the citation graph 100, with each link possibly having an associated score. For a non-limiting example, a path on a given dimension between two entities, such as a subject 102 and an object 106, includes a directed or an undirected link from the source to an intermediate entity, prefixed to a directed or undirected path from the intermediate entity to the object 106 in the same or possibly a different dimension.

In some embodiments, influence evaluation engine 204 estimates the influence of each entity as the count of actual requests for data, opinion, or searches relating to or originating from other entities, entities with direct links to the entity or with a path in the citation graph, possibly with a predefined maximum length, to the entity; such actual requests being counted if they occur within a predefined period of time and result in the use of the paths originating from the entity (e.g., representing opinions, reviews, citations or other forms of expression) with or without the count being adjusted by the possible weights on each link, the length of each path, and the level of each entity on each path.

In some embodiments, influence evaluation engine 204 adjusts the influence of each entity by metrics relating to the citation graph comprising all entities or a subset of all linked entities. For a non-limiting example, such metrics can include the density of the graph, defined as the ratio of the number of links to the number of linked entities in the graph; such metrics are transformed by mathematical functions optimal to the topology of the graph, such as where it is known that the distribution of links among entities in a given graph may be non-linear. An example of such an adjustment would be the operation of estimating the influence of an entity as the number of directed links connecting to the entity, divided by the logarithm of the density of the citation graph comprising all linked entities. For example, such an operation can provide an optimal method of estimating influence rapidly with a limited degree of computational complexity.

In some embodiments, influence evaluation engine 204 optimizes the estimation of influence for different contexts and requirements of performance, memory, graph topology, number of entities, and/or any other context and/or requirement, by any combination of the operations described above in paragraphs above, and any similar operations involving metrics including but not limited to values comprising: the number of potential source entities to the entity for which influence is to be estimated, the number of potential target entities, the number of potential directed paths between any one entity and any other entity on any or all given dimensions, the number of potential directed paths that include the entity, the number of times within a defined period that a directed link from the entity is used for a scoring, search or other operation(s).

Object Ranking

In the example of FIG. 2, object selection engine 206 utilizes influence scores of the citing subjects 102 and the number of their citations 104 to determine the selection and ranking of objects 106 cited by the citations, wherein the objects include but are not limited to documents on the Internet, products, services, data files, legal or natural persons, or any entities in any form or means that can be searched or cited over a network. Here, object selection engine 206 selects and ranks the cited objects based on ranking criteria that include but are not limited to, influence scores of the citing subjects, date or time, geographical location associated with the objects, and/or any other selection criteria.

In some embodiments, object selection engine 206 calculates and ranks the influence scores of the cited objects based on attributes of one or more of the following scoring components in combination with other attributes of objects including semantic or descriptive data regarding the objects:

Subjects of the citations: such as influence scores of the subjects/authors, expertise of the subjects on the give topic, perspective bias on the subjects of the citations.

Citations: such as text match quality (e.g., content of citations matching search terms), number of citations, date of the citations, and other citations related to the same cited object, time bias, type bias etc.

For a non-limiting example, in the example depicted in FIG. 1, citing subject Author One has an influence score of 10, which composes Citation 1.1 and Citation 1.2, wherein Citation 1.1 cites Target One once while Citation 1.2 cites Target Two twice; citing subject Author Two has an influence score of 5, which composes Citation 2.1, which cites Target One three times; citing subject Author Three has an influence score of 4, which composes Citation 3.2, which cites Target Two four times. Based on the influence scores of the authors alone, object selection engine 206 calculates the influence score of Target One as 10*1+3*5=25, while the influence score of Target Two is calculated as 10*2+4*4=36. Since Target Two has a higher influence score than Target One, it should be ranked higher than Target One in the final search result.

Figure 3:
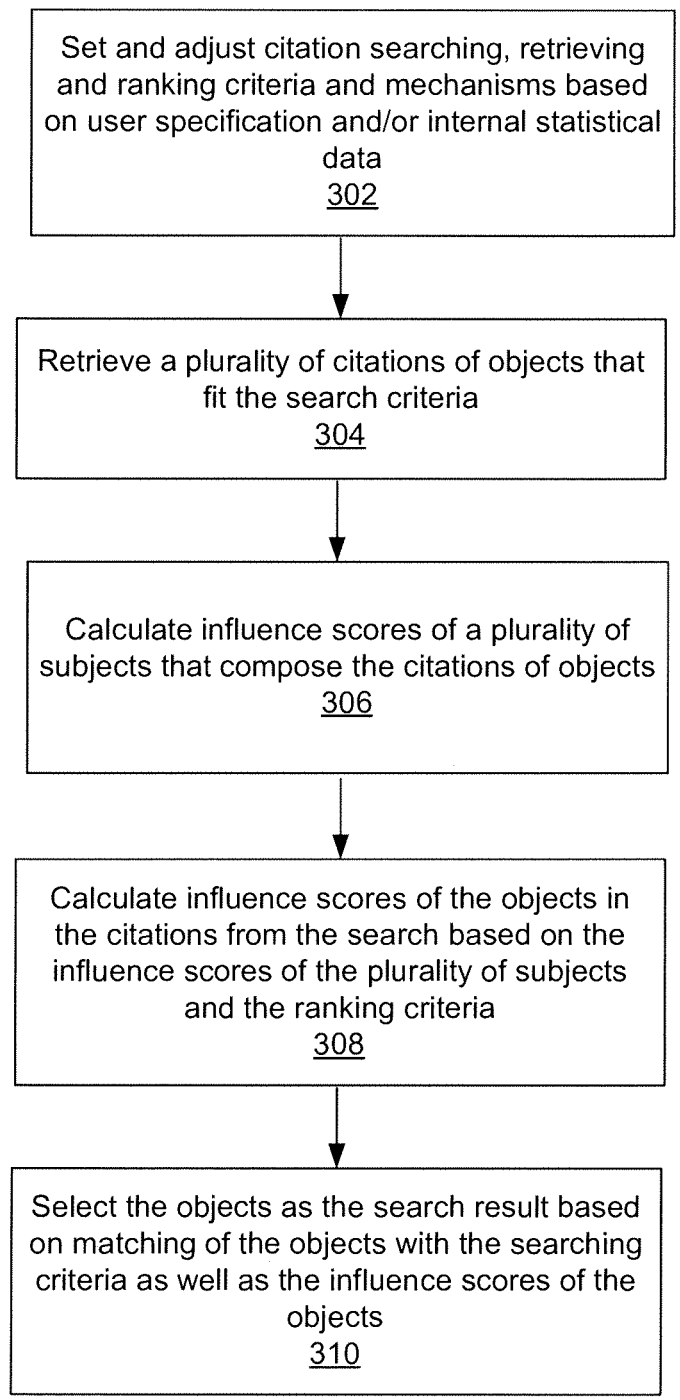
FIG. 3 depicts an example of a flowchart of a process to support determination of quality of cited objects in search results based on the influence of the citing subjects.

FIG. 3 depicts an example of a flowchart of a process to support determination of quality of cited objects in search results based on the influence of the citing subjects. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 3, the flowchart 300 starts at block 302 where citation searching, retrieving and ranking criteria and mechanisms are set and adjusted based on user specification and/or internal statistical data. The flowchart 300 continues to block 304 where a plurality of citations of objects that fit the search criteria, such as text match, time filter, author filter, type filter, are retrieved. The flowchart 300 continues to block 306 where influence scores of a plurality of subjects that compose the plurality of citations of objects are calculated. The flowchart 300 continues to block 308 where influence scores of objects in the citations from the search are calculated based on the influence scores of the plurality of subjects and the ranking criteria. The flowchart 300 ends at block 310 where objects are selected as the search result based on the matching of the objects with the searching criteria as well as influence scores of the objects.

In some embodiments, object selection engine 206 determines the qualities of the cited objects by examining the distribution of influence scores of subjects citing the objects in the search results. For a non-limiting example, one measure of the influence distribution is the ratio of the number of citations from the "influential" and the "non-influential" subjects, where "influential" subjects may, for a non-limiting example, have an influence score higher than a threshold determined by the percentile distribution of all influence scores. Object selection engine 206 accepts only those objects that show up in the citation search results if their citation ratios from "influential" and "non-influential" subjects are above a certain threshold while others can be marked as spam if the ratio of their citation ratios from "influential" and "non-influential" subjects fall below the certain threshold, indicating that they are most likely cited from spam subjects.

In some embodiments, object selection engine 206 calculates and ranks cited objects by treating citations of the objects as connections having positive or negative weights in a weighted citation graph. A citation with implicit positive weight can include, for a non-limiting example, a retweet or a link between individual blog posts or web cites, while a citation with negative weight can include, for a non-limiting example, a statement by one subject 102 that another source is a spammer.

In some embodiments, object selection engine 206 uses citations with negative weights in a citation graph-based rank/influence calculation approach to propagate negative citation scores through the citation graph. Assigning and propagating citations of negative weights makes it possible to identify clusters of spammers in the citation graph without having each spammer individually identified. Furthermore, identifying subjects/sources 102 with high influence and propagating a few negative citations from such subjects is enough to mark an entire cluster of spammers negatively, thus reducing their influence on the search result.

In some embodiments, object selection engine 206 presents the generated search results of cited objects to a user who issues the search request or provides the generated search results to a third party for further processing. In some embodiments, object selection engine 206 presents to the user a score computed from a function combining the count of citations and the influence of the subjects of the citations along with the search result of the objects. In some embodiments, object selection engine 206 displays multiple scores computed from functions combining the counts of subsets of citations and the influence of the source of each citation along with the search result, where each subset may be determined by criteria such as the influence of the subjects, or attributes of the subjects or the citations. For non limiting-examples, the following may be displayed to the user—"5 citations from Twitter; 7 citations from people in Japan; and 8 citations in English from influential users." The subsets above may be selected and/or filtered either by the object selection engine 206 or by users.

In some embodiments, object selection engine 206 selects for display of every object in the search result, one or more citations and the subjects of the citations on the basis of criteria such as the recency or the influence of their citing subjects relative to the other citations in the search result. Object selection engine 206 then displays the selected citations and/or subjects in such a way that the relationship between the search result, the citations and the subjects of the citations are made transparent to a user.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "interface" is used in the embodiments of the systems and methods described above, it will be evident that such concept can be interchangeably used with equivalent software concepts such as, class, method, type, module, component, bean, module, object model, process, thread, and other suitable concepts. While the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system, comprising:
a citation search engine with a processor, which in operation, sets and adjusts one or more of citation searching and ranking criteria based on at least one of user specification or internal statistical data, the citation search engine to receive a web search query having a searching criterion and produce citation search results by retrieving a plurality of citations each describing an opinion of a subject or an object, each subject is a representation of a user and having a subject influence score indicating a degree to which the subject's opinion influences other subjects, each object having an object influence score indicating collective opinions of a plurality of subjects citing the object and each object is accessible by the web search query, and the citation search engine searches a citation graph that includes nodes, at least some of the nodes of the citation graph are objects and subjects, and at least one edge between an object node and a subject node represents an opinion of an object of the object node from a subject of the subject node;
an influence evaluation engine with a processor, which in operation, calculates a subject influence score for one of the plurality of subjects based on how often that subject is cited by another one of the plurality of subjects, with the subject influence scores being used as a ranking of objects obtained from the plurality of citations from the citation search results;

an object selection engine with a processor, which in operation, calculates object influence scores of the plurality of objects in the plurality of citations based on the subject influence scores of the plurality of subjects and the ranking criteria, utilizes the object influence scores to determine a selection and ranking of objects cited by the citations, selects as a search result of the web search query the plurality of objects based on both matching of the objects with the searching criteria as well as the object influence scores of the objects, and ranks the plurality of objects based on the object influence scores of the plurality of objects.

2. The system of claim 1, wherein:
each of the plurality of subjects has an opinion wherein expression of the opinion is explicit, expressed, implicit, or imputed through any other technique.

3. The system of claim 1, wherein:
each of the plurality of subjects is one of: representation of a person, and entities representing Internet authors or users of social media services, user of microblogging services, users of social networks, reviewer who provides expressions of opinion, reviews, or other information useful for the estimation of influence.

4. The system of claim 1, wherein:
each of the plurality of objects is one of: Internet web sites, blogs, videos, books, films, music, image, video, documents, data files, objects for sale, objects that are reviewed or recommended or cited, or any entities that are associated with a Uniform Resource Identifier (URI).

5. The system of claim 1, wherein:
each of the plurality of citations includes one or more of: expression of opinions on the objects, expressions of authors in the form of Tweets, blog posts, reviews of objects on Internet web sites Wikipedia entries, postings to social media, postings to websites, postings in the form of reviews, recommendations, or any other form of citation made to mailing lists, newsgroups, discussion forums, comments to websites or any other form of Internet publication.

6. The system of claim 1, wherein:
each of the plurality of citations is made by a subject regarding an object, a subject regarding another subject, or an object regarding another object.

7. The system of claim 1, wherein:
the citation search engine enables a citation centric search process that focuses on influence of the plurality subjects that cite the plurality of objects.

8. The system of claim 1, wherein:
the citation search engine accepts and enforces a plurality of criteria on citation searching, retrieving and ranking, each of which is either be explicitly described by a user or best guessed by the system based on internal statistical data.

9. The system of claim 8, wherein:
the plurality of criteria include one or more of constraints for the plurality of citations, type of the plurality of objects cited, and ranking bias of the cited objects.

10. The system of claim 1, wherein:
the subject influence score of each of the plurality of subjects indicates degree to which the subject's opinion influences other subjects and/or a community of subjects.

11. The system of claim 1, wherein:
the subject influence score of each of the plurality of objects indicates collective opinions of the plurality of subjects citing the object.

12. The system of claim 1, wherein:
some of the plurality of subjects are related to each other via an influence network or community.

13. The system of claim 12, wherein:
the influence evaluation engine calculates the subject influence scores of the plurality of subjects based on their authorities in the influence network.

14. The system of claim 1, wherein:
the influence evaluation engine calculates the subject influence scores of the plurality of subjects on one or more dimensions that are related to one or more of the objects cited by the subjects, form of the citations, and search terms.

15. The system of claim 1, wherein:
the influence evaluation engine determines an influence score for a first subject in the plurality of subjects at least partly based on how often the first subject is cited or referenced by one or more second subjects in the plurality of subjects.

16. The system of claim 15, wherein:
each of the one or more second objects references a citation of an object by the first subject.

17. The system of claim 15, wherein:
the influence evaluation engine computes the number of the citations of the first subject by the second subjects as the citation score and takes into account the influence of the second subjects citing the first subject in the citation score.

18. The system of claim 1, wherein:
the influence evaluation engine calculates the subject influence scores of the plurality of subjects based on a citation graph having the plurality of subjects and the plurality of objects as its entities and the plurality of citations as its edges.

19. The system of claim 18, wherein:
the influence evaluation engine allows for attribution of influence on the plurality of subjects to data sources to be estimated and distributed based on the citation graph.

20. The system of claim 18, wherein:
the influence evaluation engine estimates the subject influence score of each entity from one or more of count of actual requests for data, opinion, or searches relating to or originating from other entities, entities with direct links to the entity or with a path in the citation graph.

21. The system of claim 18, wherein:
the influence evaluation engine adjusts the subject influence score of each entity in the citation graph by metrics relating to the citation graph comprising all entities or a subset of all linked entities in the citation graph.

22. The system of claim 1, wherein:
the ranking criteria include one or more of: subject influence scores of the citing subjects, date or time, and geographical location associated with the objects.

23. The system of claim 1, wherein:
the object selection engine determines qualities of the cited objects by examining the distribution of the subject influence scores of the subjects citing the objects in the search results.

24. The system of claim 23, wherein:
one measure of the influence distribution is the citation ratio of the number of citations from influential and non-influential subjects.

25. The system of claim 23, wherein:
the object selection engine accepts only those objects that show up in the search results if their citation ratios from influential and non-influential subjects are above a certain threshold while others can be marked as spam if the ratio of their citation ratios from the influential and non-influential subjects fall below the certain threshold.

26. The system of claim 1, wherein:
the object selection engine calculates and ranks the plurality of objects by treating citations of the objects as connections having positive or negative scores in the weighted citation graph.

27. The system of claim 26, wherein:
the object selection engine propagates negative citation scores through the citation graph to identify one or more spammers and to reduce their influence on the search result.

28. The system of claim 1, wherein:
the object selection engine presents the search results of cited objects to a user who issues the search request or provides the generated search results to a third party for further processing.

29. The system of claim 28, wherein:
the object selection engine presents to the user a score computed from a function combining the count of citations and the influence of the subjects of the citations along with the search result of the objects.

30. The system of claim 28, wherein:
the object selection engine selects for display of every object in the search result, one or more citations and the subjects of the citations on the basis of criteria such as the recency or the influence of their citing subjects relative to the other citations in the search result.

31. The system of claim 30, wherein:
the object selection engine displays the selected citations and/or subjects in such a way that the relationship between the search result, the citations and the subjects of the citations are made transparent to a user.

32. A method, comprising:
using a processor to set and adjust one or more of citation searching, retrieving, and ranking criteria based on at least one of user specification or internal statistical data;
using a processor to receive a web search query having a searching criterion;
using a processor to retrieve a plurality of citations composed by a plurality of subjects citing a plurality of objects that fit the searching criteria, each citation describing an opinion of a subject or an object, each subject is a representation of a user and having a subject influence score indicating a degree to which the subject's opinion influences other subjects and each object having an object influence score indicating collective opinions of a plurality of subjects citing the object and each object is accessible by the web search query, wherein the plurality of citations are retrieved by searching a citation graph that includes nodes, at least some of the nodes of the citation graph are objects and subjects, and at least one edge between an object node and a subject node represents an opinion of an object of the object node from a subject of the subject node;
using a processor to calculate subject influence score for one of the plurality of subjects that compose the plurality of citations citing the plurality of objects based on how often that subject is cited by another one of the plurality of subjects;
using a processor to calculate object influence scores of the plurality of objects in the plurality of citations based on the subject influence scores of the plurality of subjects and the ranking criteria, the subject influence scores being used as a ranking of objects obtained from the plurality of citations;
using a processor to select as a search result of the search query the plurality of objects based on both matching of the objects with the searching criteria as well as the object influence scores of the objects;
utilizing with a processor the object influence scores to determine a selection and ranking of objects cited by the citations; and
using a processor to rank the plurality of objects based on the object influence scores of the plurality of objects.

33. The method of claim 32, further comprising:
enabling a citation centric search process that focuses on influence of the plurality subjects that cite the plurality of objects.

34. The method of claim 32, further comprising:
accepting and enforcing a plurality of criteria on citation searching, retrieving and ranking, each of which is either be explicitly described by a user or best guessed by the system based on internal statistical data.

35. The method of claim 32, further comprising:
calculating the subject influence scores of the plurality of subjects based on their authorities in an influence network.

36. The method of claim 32, further comprising:
calculating the subject influence scores of the plurality of subjects on one or more dimensions that are related to one or more of the objects cited by the subjects, form of the citations, and search terms.

37. The method of claim 32, further comprising:
determining a subject influence score for a first subject in the plurality of subjects at least partly based on how often the first subject is cited or referenced by one or more second subjects in the plurality of subjects.

38. The method of claim 37, further comprising:
computing the number of the citations of the first subject by the second subjects as the citation score and takes into account the influence of the second subjects citing the first subject in the citation score.

39. The method of claim 32, further comprising:
calculating the subject influence scores of the plurality of subjects based on a citation graph having the plurality of subjects and the plurality of objects as its entities and the plurality of citations as its edges.

40. The method of claim 39, further comprising:
determining the subject influence scores for each entity within the citation graph on a specific given dimension.

41. The method of claim 39, further comprising:
estimating the subject influence score of each entity from one or more of count of actual requests for data, opinion, or searches relating to or originating from other entities, entities with direct links to the entity or with a path in the citation graph.

42. The method of claim 39, further comprising:
adjusting the subject influence score of each entity in the citation graph by metrics relating to the citation graph comprising all entities or a subset of all linked entities in the citation graph.

43. The method of claim 32, further comprising:
determining qualities of the cited objects by examining the distribution of the influence scores of the subjects citing the objects in the search results.

44. The method of claim 43, further comprising:
accepting only those objects that show up in the search results if their citation ratios from influential and non-influential subjects are above a certain threshold while others can be marked as spam if the ratio of their citation ratios from the influential and non-influential subjects fall below the certain threshold.

45. The method of claim 32, further comprising:
calculating and ranking the plurality of objects by treating citations of the objects as connections having positive or negative scores in the weighted citation graph.

46. The method of claim 45, further comprising:
propagating negative citation scores through the citation graph to identify one or more spammers and to reduce their influence on the search result.

47. The method of claim 32, further comprising:
presenting the search results of cited objects to a user who issues the search request or provides the generated search results to a third party for further processing.

48. The method of claim 47, further comprising:
presenting to the user a score computed from a function combining the count of citations and the influence of the subjects of the citations along with the search result of the objects.

49. The method of claim 47, further comprising:
selecting for display of every object in the search result, one or more citations and the subjects of the citations on the basis of criteria such as the recency or the influence of their citing subjects relative to the other citations in the search result.

50. The method of claim 49, further comprising:
displaying the selected citations and/or subjects in such a way that the relationship between the search result, the citations and the subjects of the citations are made transparent to a user.

51. A non-transitory machine-readable medium containing executable program instructions which when executed by a data processing device cause the device to perform a method, the method comprising:
setting and adjusting one or more of citation searching, retrieving, and ranking criteria based on at least one of user specification or internal statistical data;
receiving a web search query having a searching criterion;
retrieving a plurality of citations composed by a plurality of subjects citing a plurality of objects that fit a searching criteria, each citation describing an opinion of a subject or an object, each subject is a representation of a user and having a subject influence score indicating a degree to which the subject's opinion influences other subjects and each object having an object influence score indicating collective opinions of a plurality of subjects citing the object to and each object is accessible by the web search query, wherein the plurality of citations are retrieved by searching a citation graph that includes nodes, at least some of the nodes of the citation graph are objects and subjects, and at least one edge between an object node and a subject node represents an opinion of an object of the object node from a subject of the subject node;
calculating a subject influence score for one of the plurality of subjects that compose the plurality of citations citing the plurality of objects based on how often that subject is cited by another one of the plurality of subjects;
calculating object influence scores of the plurality of objects in the plurality of citations based on the subject influence scores of the plurality of subjects and the ranking criteria, the subject influence scores being used as a ranking of objects obtained from the plurality of citations;
selecting as a search result of the search query the plurality of objects based on both matching of the objects with the searching criteria as well as the object influence scores of the objects;
utilizing the object influence scores to determine a selection and ranking of objects cited by the citations; and
ranking the plurality of objects based on the object influence scores of the plurality of objects.

* * * * *